(12) United States Patent
Sun et al.

(10) Patent No.: US 11,151,111 B2
(45) Date of Patent: Oct. 19, 2021

(54) REDISTRIBUTING TABLE DATA IN A DATABASE CLUSTER

(71) Applicant: Futurewei Technologies, Inc., Plano, TX (US)

(72) Inventors: Jason Yang Sun, Santa Clara, CA (US); Cheng Zhu, Santa Clara, CA (US); Le Cai, Cupertino, CA (US); Qingqing Zhou, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 513 days.

(21) Appl. No.: 15/827,660

(22) Filed: Nov. 30, 2017

(65) Prior Publication Data
US 2019/0163773 A1 May 30, 2019

(51) Int. Cl.
  *G06F 16/22* (2019.01)
  *G06F 16/27* (2019.01)
  (Continued)

(52) U.S. Cl.
  CPC ...... *G06F 16/2282* (2019.01); *G06F 16/2471* (2019.01); *G06F 16/2474* (2019.01);
  (Continued)

(58) Field of Classification Search
  CPC ............. G06F 16/2282; G06F 16/2471; G06F 16/27; G06F 16/285; G06F 16/24532; G06F 16/2474
  (Continued)

(56) References Cited

U.S. PATENT DOCUMENTS

| | | | |
|---|---|---|---|
| 6,122,640 A * | 9/2000 | Pereira | G06F 16/2282 707/648 |
| 8,554,726 B2 * | 10/2013 | Frantz | G06F 16/284 707/613 |
| 9,805,071 B1 | 10/2017 | Ellis et al. | |

(Continued)

FOREIGN PATENT DOCUMENTS

| | | |
|---|---|---|
| CN | 102521297 B | 9/2015 |
| CN | 106407308 A | 2/2017 |

OTHER PUBLICATIONS

"International Application No. PCT/CN2018/116737, International Search Report and Written Opinion dated Feb. 21, 2019", (Feb. 21, 2019), 8 pgs.

(Continued)

*Primary Examiner* — Robert W Beausoliel, Jr.
*Assistant Examiner* — Arthur Ganger
(74) *Attorney, Agent, or Firm* — Schwegman Lundberg & Woessner, P.A.

(57) ABSTRACT

A computer-implemented method of relocating data in a distributed database comprises: creating, by one or more processors, a second table in the distributed database, the second table including all columns from a first table; copying, by the one or more processors, a first set of tuples from the first table to the second table; modifying, by the one or more processors, during the copying of the first set of tuples, data of the first table according to a modification; after the copying of the first set of tuples, modifying, by the one or more processors, data of the second table according to the modification; and switching, by the one or more processors, the second table for the first table in a catalog of the distributed database.

20 Claims, 10 Drawing Sheets

(51) Int. Cl.
  *G06F 16/28*   (2019.01)
  *G06F 16/2458*  (2019.01)
  *G06F 16/2453*  (2019.01)

(52) U.S. Cl.
  CPC ........ *G06F 16/24532* (2019.01); *G06F 16/27* (2019.01); *G06F 16/285* (2019.01)

(58) Field of Classification Search
  USPC ........................................................ 707/802
  See application file for complete search history.

(56) References Cited

U.S. PATENT DOCUMENTS

| | | | |
|---|---|---|---|
| 2012/0054367 A1* | 3/2012 | Ramakrishnan | G06F 9/4856 709/242 |
| 2012/0254175 A1 | 10/2012 | Horowitz et al. | |
| 2012/0310991 A1 | 12/2012 | Frantz et al. | |
| 2013/0086464 A1 | 4/2013 | Thangappan | |
| 2014/0095429 A1* | 4/2014 | Frantz | G06F 16/284 707/609 |
| 2016/0210340 A1 | 7/2016 | Cai et al. | |
| 2017/0109386 A1* | 4/2017 | Baer | G06F 16/2282 |
| 2019/0205455 A1* | 7/2019 | Jugel | G06F 16/27 |

OTHER PUBLICATIONS

Cohen, Jeffrey, et al., "Online Expansion of Large-scale Data Warehouses", *Proceedings of the VLDB Endowment*, vol. 4, No. 12, (2011), 1249-1259.

"European Application No. 18883437.8, Extended European Search Report dated Aug. 13, 2020", (Aug. 13, 2020), 8 pgs.

* cited by examiner

REDISTRIBUTING TABLE DATA IN A DATABASE CLUSTER

TECHNICAL FIELD

The present disclosure is related to database clusters and, in one particular embodiment, to redistributing table data in a database cluster.

BACKGROUND

A distributed database consists of multiple nodes in a database cluster. Table data is divided into multiple partitions with each node storing one partition. One method of distribution is hashing, such that each node is assigned a range of hash values. Each row of table data is hashed and stored on the node assigned to the hash value. One node may eventually run out of storage or contain disproportional amount of data (data skew). Since each node processes queries in parallel, the response time of the distributed database is controlled by the slowest node. As a result, when data is not distributed evenly, the performance of the distributed database suffers. The performance of the distributed database may be improved by adding a node or, in the case of data skew, by selecting a different hash function.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

According to one aspect of the present disclosure, there is provided a computer-implemented method of relocating data in a distributed database that comprises: creating, by one or more processors, a second table in the distributed database, the second table including all columns from a first table; copying, by the one or more processors, a first set of tuples from the first table to the second table; modifying, by the one or more processors, during the copying of the first set of tuples, data of the first table according to a modification; after the copying of the first set of tuples, modifying, by the one or more processors, data of the second table according to the modification; and switching, by the one or more processors, the second table for the first table in a catalog of the distributed database.

Optionally, in any of the preceding embodiments, the method further comprises: distributing data for the first table among nodes of the distributed database based on a first hash function; and wherein the copying of the first set of tuples from the first table to the second table comprises distributing data for the first table among nodes of the distributed database based on a second hash function different from the first hash function.

Optionally, in any of the preceding embodiments, the modifying of the data of the first table according to the modification comprises appending a tuple to the data of the first table.

Optionally, in any of the preceding embodiments, the creating of the second table comprises creating the second table with an additional column not from the first table.

Optionally, in any of the preceding embodiments, the method further comprises: prior to the switching of the second table for the first table in the catalog, dropping the additional column.

Optionally, in any of the preceding embodiments, the method further comprises: creating a third table to track deletions from the first table; receiving a request to delete a first tuple from the first table; and responsive to the request, adding a second tuple to the third table that includes an identifier of the tuple; and wherein the modifying of the data of the first table according to the modification comprises deleting the first tuple from the data of the first table.

Optionally, in any of the preceding embodiments, the modifying of the data of the second table according to the modification comprises: based on the identifier included in the second tuple of the third table and a third tuple of the second table, deleting the third tuple from the second table.

Optionally, in any of the preceding embodiments, the method further comprises: creating a third table to track deletions from the first table; receiving a request to update a first tuple of the first table, the request including modification data; responsive to the request: adding a second tuple to the third table that includes an identifier of the first tuple; and appending a third tuple to the first table that includes the modification data; and wherein the modifying of the data of the second table according to the modification comprises: based on the identifier included in the second tuple of the third table and a fourth tuple of the second table, deleting the fourth tuple from the second table; and appending a fifth tuple to the second table that includes the modification data.

Optionally, in any of the preceding embodiments, the method further comprises: before the switching of the second table for the first table in the catalog of the distributed database, locking the first table.

Optionally, in any of the preceding embodiments, the method further comprises: determining a number of modifications remaining to be applied to the second table; and wherein the locking of the first table is based on the number of modifications and a predetermined threshold.

Optionally, in any of the preceding embodiments, the method further comprises: determining a number of modifications remaining to be applied to the second table; and based on the number of modifications remaining to be applied to the second table and a predetermined threshold, applying at least a subset of the modifications to the second table without locking the first table.

According to one aspect of the present disclosure, there is provided a distributed database that comprises: a plurality of data storage nodes; a memory storage comprising instructions; and one or more processors in communication with the memory, wherein the one or more processors execute the instructions to perform: creating a second table in the distributed database, the second table including all columns from a first table; copying a first set of tuples from the first table to the second table; modifying during the copying of the first set of tuples, data of the first table according to a modification; after the copying of the first set of tuples, modifying data of the second table according to the modification; and switching the second table for the first table in a catalog of the distributed database.

Optionally, in any of the preceding embodiments, the one or more processors further perform: distributing data for the first table among nodes of the distributed database based on a first hash function; and wherein the copying of the first set of tuples from the first table to the second table comprises distributing data for the first table among nodes of the distributed database based on a second hash function different from the first hash function.

Optionally, in any of the preceding embodiments, the modifying of the data of the first table according to the modification comprises appending a tuple to the data of the first table.

Optionally, in any of the preceding embodiments, the creating of the second table comprises creating the second table with an additional column not from the first table.

Optionally, in any of the preceding embodiments, the one or more processors further perform: prior to the switching of the second table for the first table in the catalog, dropping the additional column.

Optionally, in any of the preceding embodiments, the one or more processors further perform: creating a third table to track deletions from the first table; receiving a request to delete a first tuple from the first table; and responsive to the request, adding a second tuple to the third table that includes an identifier of the tuple; and wherein the modifying of the data of the first table according to the modification comprises deleting the first tuple from the data of the first table.

Optionally, in any of the preceding embodiments, the modifying of the data of the second table according to the modification comprises: based on the identifier included in the second tuple of the third table and a third tuple of the second table, deleting the third tuple from the second table.

Optionally, in any of the preceding embodiments, the one or more processors further perform: creating a third table to track deletions from the first table; receiving a request to update a first tuple of the first table, the request including modification data; responsive to the request: adding a second tuple to the third table that includes an identifier of the first tuple; and appending a third tuple to the first table that includes the modification data; and wherein the modifying of the data of the second table according to the modification comprises: based on the identifier included in the second tuple of the third table and a fourth tuple of the second table, deleting the fourth tuple from the second table; and appending a fifth tuple to the second table that includes the modification data.

According to one aspect of the present disclosure, there is provided a non-transitory computer-readable medium storing computer instructions for locating data in a distributed database, that when executed by one or more processors, cause the one or more processors to perform steps of: creating a second table in the distributed database, the second table including all columns from a first table; copying a first set of tuples from the first table to the second table; modifying during the copying of the first set of tuples, data of the first table according to a modification; after the copying of the first set of tuples, modifying data of the second table according to the modification; and switching the second table for the first table in a catalog of the distributed database.

Any one of the foregoing examples may be combined with any one or more of the other foregoing examples to create a new embodiment within the scope of the present disclosure.

DETAILED DESCRIPTION

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other type of processor operating on a computer system, turning such a computer system into a specifically programmed machine.

In a typical distributed database, data for a table is distributed among computing nodes based on a hash value for each tuple in the table. A tuple is an entry in a database (e.g., a row in a row-oriented database, a column in a column-oriented database, or an object in an object-oriented database). In some instances, the hash function does not distribute the tuples evenly between the computing nodes. This results in an increased response time to database queries, since the query cannot complete until each computing node has completed its query of the data and processing time increases as the number of tuples increases. To address this problem, the table may be redistributed among the computing nodes by using a different hash function or changing the set of hash values assigned to each computing node. Using existing solutions, the table is locked during this process, preventing the insertion or update of any existing rows in the table.

Using the systems and methods proposed herein, data for a table may be redistributed in a distributed database with a substantially reduced period of time in which the table is locked. When a table (the "old table") is to be redistributed, a new table is created with the columns of the old table and an additional system column that contains a unique identifier for each tuple. The property of the old table is modified so that insertions to the table always append data to the old table rather than reusing space created by deleting data. An additional table is created to track the unique identifiers of tuples deleted from the old table during the redistribution process, referred to as a delete delta table. During the redistribution process, updates to tuples in the old table are replaced by deletion of the existing tuple and insertion of the updated tuple.

Tuples are copied from the old table to the new table, wherein the new table is distributed using a different hash function or a different distribution of hash values among the database nodes. During the copying process, insertions, updates, and deletions may be applied to the old table. After the copying process is complete, tuples indicated in the delete delta table are deleted from the new table and the delete delta table. Since insertions and updates to the old table were appended to the old table, the added tuples can be copied from the old table to the new table by continuing from the point at which the first copy completed. The process of applying deletions and copying insertions continues until the number of unapplied changes falls below a predetermined threshold (e.g., 1000 tuples).

At this point, the old table and the new table are locked to prevent further changes by other user operations. The last set of deletions and insertions are applied to the new table, the additional system column is dropped from the new table, and the new table is swapped for the old table in the system catalog. After the swap, the new table is unlocked and the old table is dropped.

In this way, the table is locked for a short period of time (typically less than a couple of seconds) in which the final set of changes are applied and the new table is swapped for the old table, improving the availability of table for user application of the distributed database during the redistribution of the data. Due to the reduced interruption to user application of redistributing the data, a distributed database using this methodology may be able to provide the ability to frequently adjust the cluster size with minimal interruption to user workload according to the needs of workload and data size fluctuation. Additionally or alternatively, by using one or more of the methodologies described herein, insert, update, and delete operations are supported while data redistribution is being performed.

Figure 1:
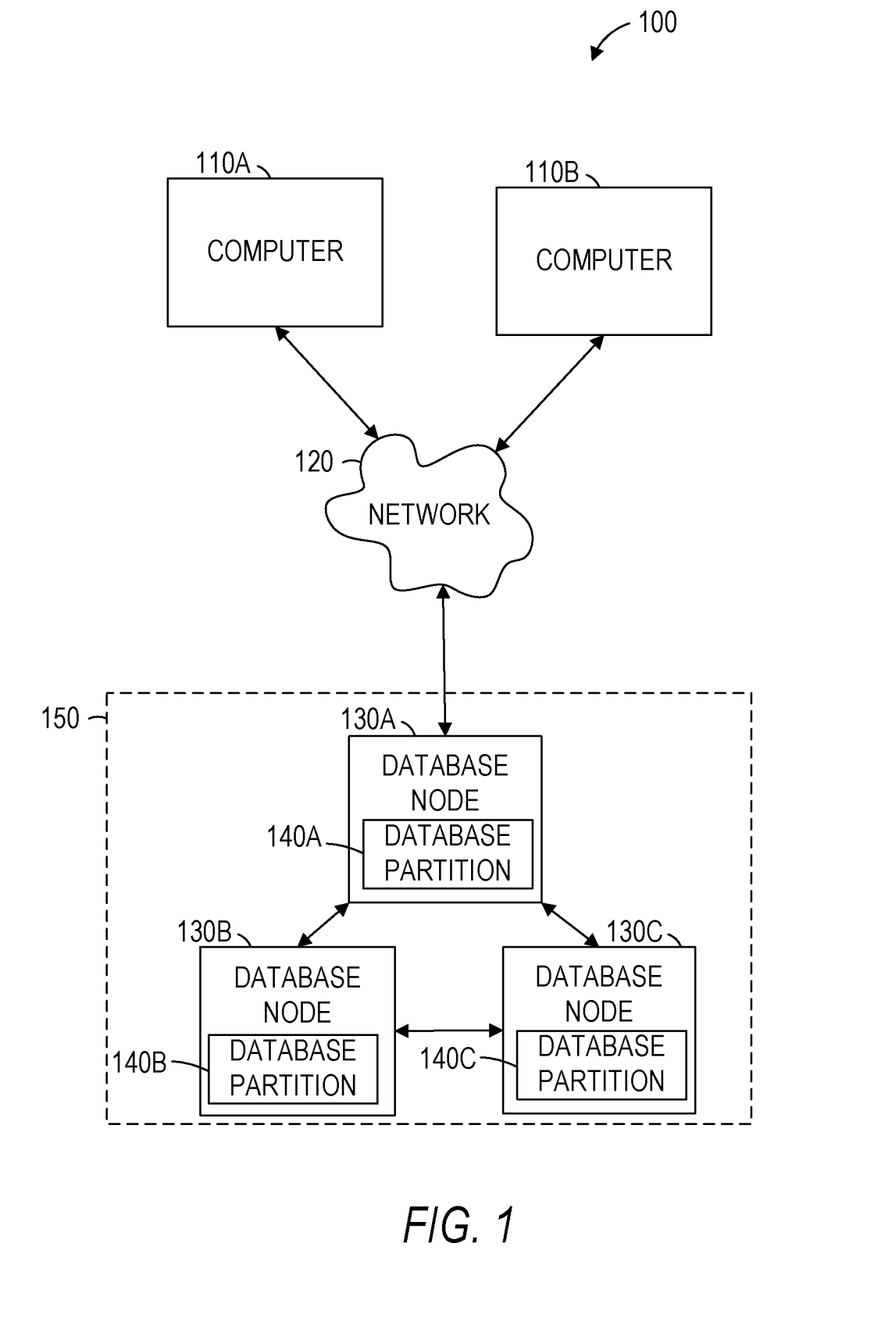
FIG. 1 is an illustration of an example distributed database in a network environment, according to some example embodiments.

FIG. 1 is an illustration of an example distributed database 150 in a network environment 100, according to some example embodiments. The example network environment 100 includes computers 110A and 110B communicating via a network 120. The distributed database 150 includes database nodes 130A, 130B, and 130C. The database nodes 130A-130C may be connected via the network 120. The database node 130A includes a database partition 140A, the database node 130B includes a database partition 140B, and database node 130C includes a database partition 140C. The database nodes 130A-130C may be referred to collectively as database nodes 130 or generically as a database node 130. The database partitions 140A-140C may be referred to collectively as database partitions 140 or generically as a database partition 140. The computers 110A-110B may be referred to collectively as computers 110 or generically as a computer 110. Any one or more of the computers 110 and the database nodes 130 may be implemented by a computer system described below in FIG. 2.

The computers 110 may send database queries (e.g., select, update, delete, and insert queries) to the distributed database 150 via the network 120. The distributed database 150 may receive the queries via a single database node (e.g., the database node 130A). The received query may be transmitted among the database nodes 130 for processing on each database node 130 in view of the corresponding database partition 140. The results from the database nodes 130 are aggregated (e.g., by the database node 130A) and provided to the requesting computer 110 via the network 120. The database nodes 130 may communicate among themselves via the network 120 or another network.

Figure 2:
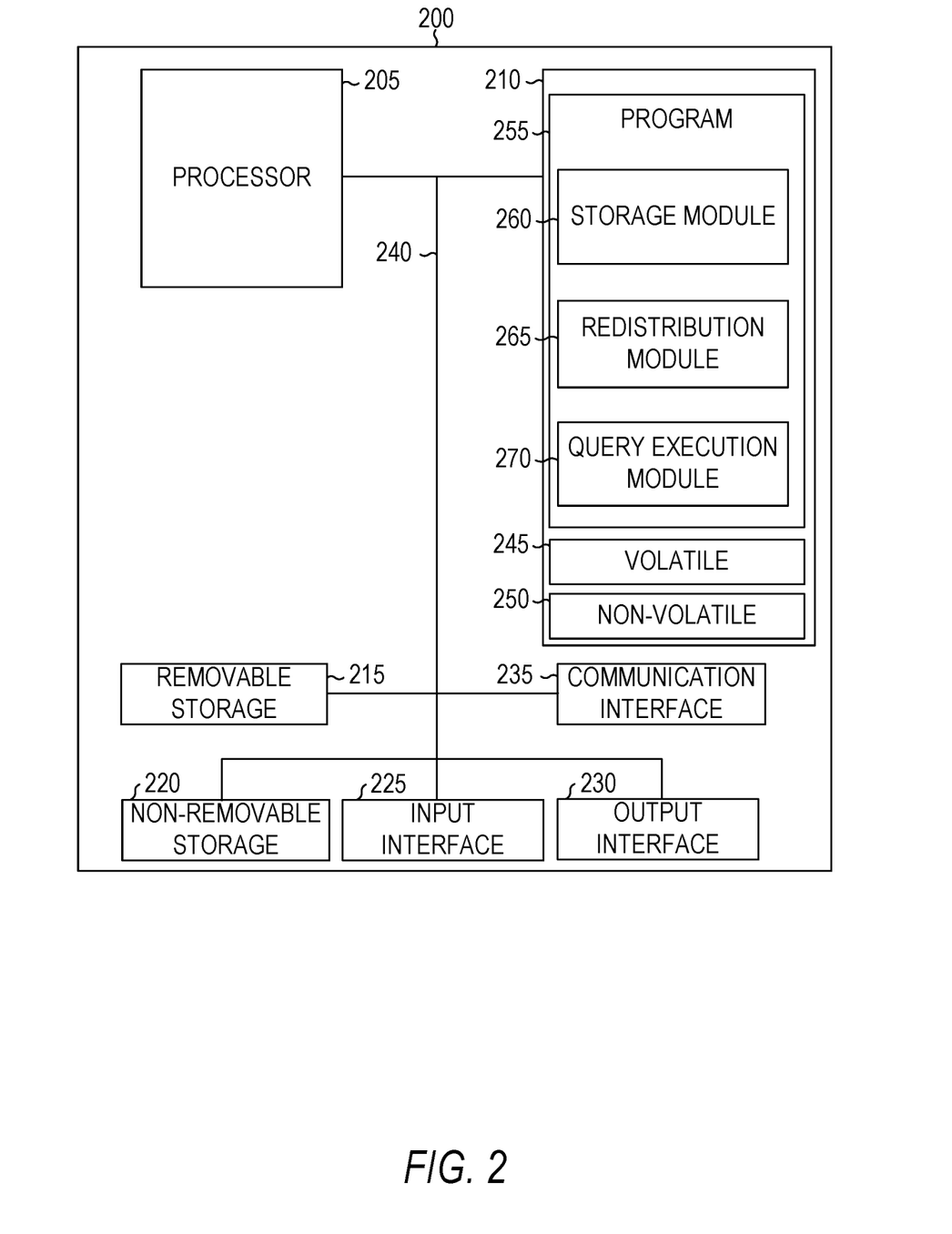
FIG. 2 is a block diagram illustrating circuitry for a database node that implements algorithms and perform methods, according to some example embodiments.

FIG. 2 is a block diagram illustrating circuitry for a computer 200 that implements algorithms and perform methods, according to some example embodiments. All components need not be used in various embodiments. For example, clients, servers, autonomous systems, network devices, and cloud-based network resources may each use a different set of components, or, in the case of servers for example, larger storage devices.

One example computing device in the form of a computer 200 (also referred to as a database node 200, a computing device 200, and a computer system 200) may include a processor 205, memory storage 210, removable storage 215, and non-removable storage 220, all connected by a bus 240. Although the example computing device is illustrated and described as the computer 200, the computing device may be in different forms in different embodiments. For example, the computing device may instead be a smartphone, a tablet, a smartwatch, or another computing device including elements the same as or similar to those illustrated and described with regard to FIG. 2. Devices such as smartphones, tablets, and smartwatches are generally collectively referred to as "mobile devices" or "user equipment." Further, although the various data storage elements are illustrated as part of the computer 200, the storage may also or alternatively include cloud-based storage accessible via a network, such as the Internet, or server-based storage.

The memory storage 210 may include volatile memory 245 and non-volatile memory 250, and may store a program 255. The computer 200 may include, or have access to a computing environment that includes, a variety of computer-readable media, such as the volatile memory 245, the non-volatile memory 250, the removable storage 215, and the non-removable storage 220. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 200 may include or have access to a computing environment that includes an input interface 225, an output interface 230, and a communication interface 235. The output interface 230 may interface to or include a display device, such as a touchscreen, that also may serve as an input device. The input interface 225 may interface to or include one or more of a touchscreen, a touchpad, a mouse, a keyboard, a camera, one or more device-specific buttons, one or more sensors integrated within or coupled via wired or wireless data connections to the computer 200, and other input devices. The computer 200 may operate in a networked environment using the communication interface 235 to connect to one or more remote computers, such as database servers. The remote computer may include a personal computer (PC), server, router, switch, network PC, peer device or other common network node, or the like. The communication interface 235 may connect to a local-area network (LAN), a wide-area network (WAN), a cellular network, a WiFi network, a Bluetooth network, or other networks.

Though the computer 200 is shown as having a single one of each element 205-270, multiples of each element may be present. For example, multiple processors 205, multiple input interfaces 225, multiple output interfaces 230, and multiple communication interfaces 235 may be present. In some example embodiments, different communication interfaces 235 are connected to different networks.

Computer-readable instructions stored on a computer-readable medium (e.g., the program 255 stored in the memory storage 210) are executable by the processor 205 of the computer 200. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 255 is shown as including a storage module 260, a redistribution module 265, and a query execution module 270. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The storage module 260 determines when data is partitioned across multiple database nodes in a way that impedes performance. The determination may be made based on the average number of IO requests and the average response time, on a difference between the largest and smallest database partitions for a table exceeding a predetermined threshold (e.g., 50%), or any suitable combination thereof.

The redistribution module 265 redistributes data among database nodes. The redistribution may be performed in response to a determination by the storage module 260 that the current data distribution is impeding performance. The storage module 260 determines hash values for tuples and assigns tuples to database nodes based on the hash values.

The query execution module 270 of a database node 130 receives queries from clients of the distributed database 150 or from other database nodes 130 of the distributed database 150. The query execution module 270 executes the received queries against the database partition 140 of the database node 130 and provides responsive results, adds data to the database partition, deletes data from the database partition, or any suitable combination thereof.

Figure 3:
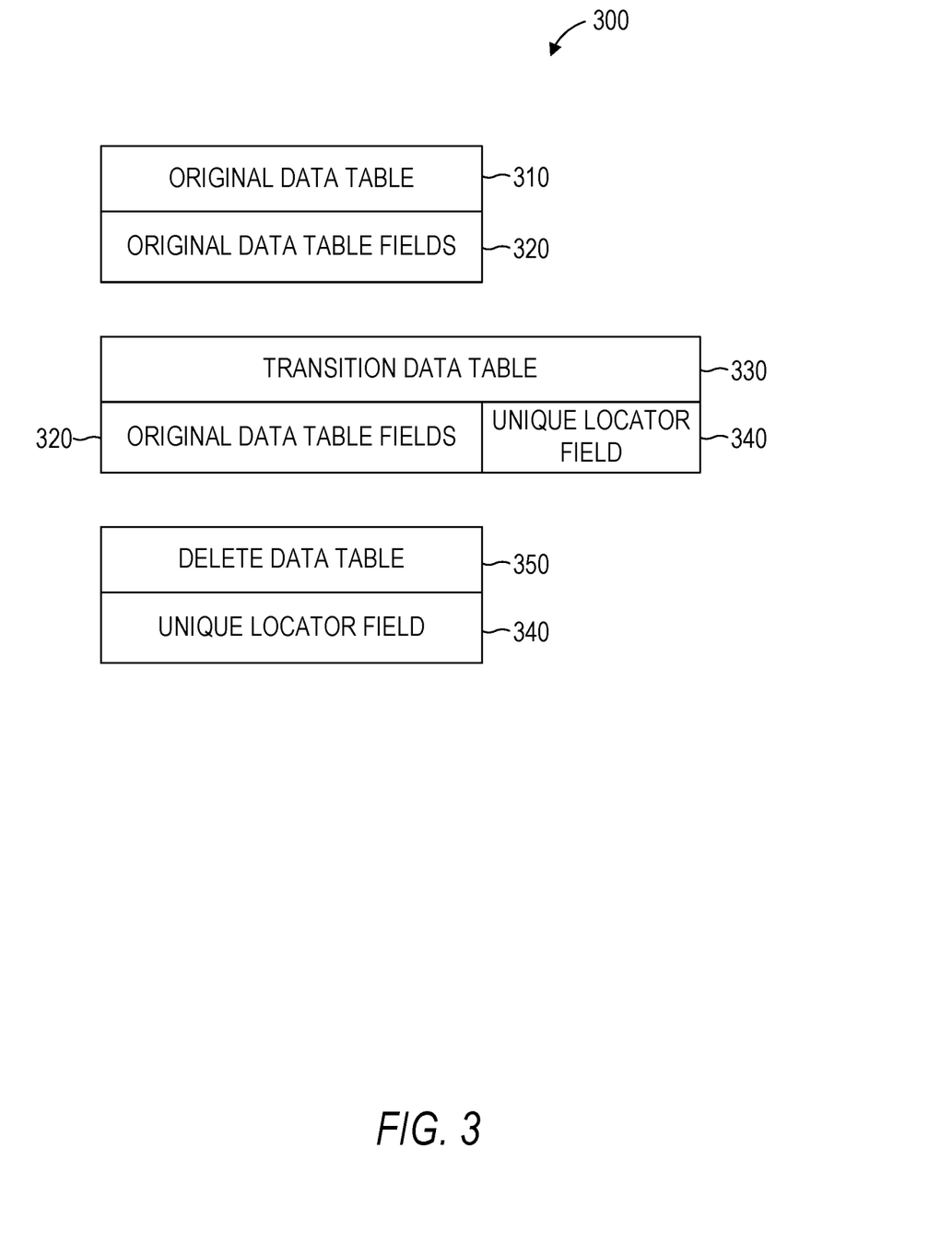
FIG. 3 is an illustration of a database schema for redistributing table data in a database cluster, according to some example embodiments.

FIG. 3 is an illustration of a database schema 300 for redistributing table data in a database cluster, according to some example embodiments. The database schema 300 includes an original data table 310 using original data table fields 320, a transition data table 330 using the original data table field 320 and a unique locator field 340, and a delete data table 350 that includes the unique locator field 340.

The original data table 310 may be a data table that is being repartitioned among database nodes. The transition data table 330 may be a data table created to store the data during the repartitioning process. The transition data table 330 may store tuples from the original data table 310 using the original data fields 320, and also stores a unique locator for each tuple in the unique locator field 340. The delete data table 350 stores the unique locator for tuples deleted from the original data table 310 during the repartitioning process.

Figure 4:
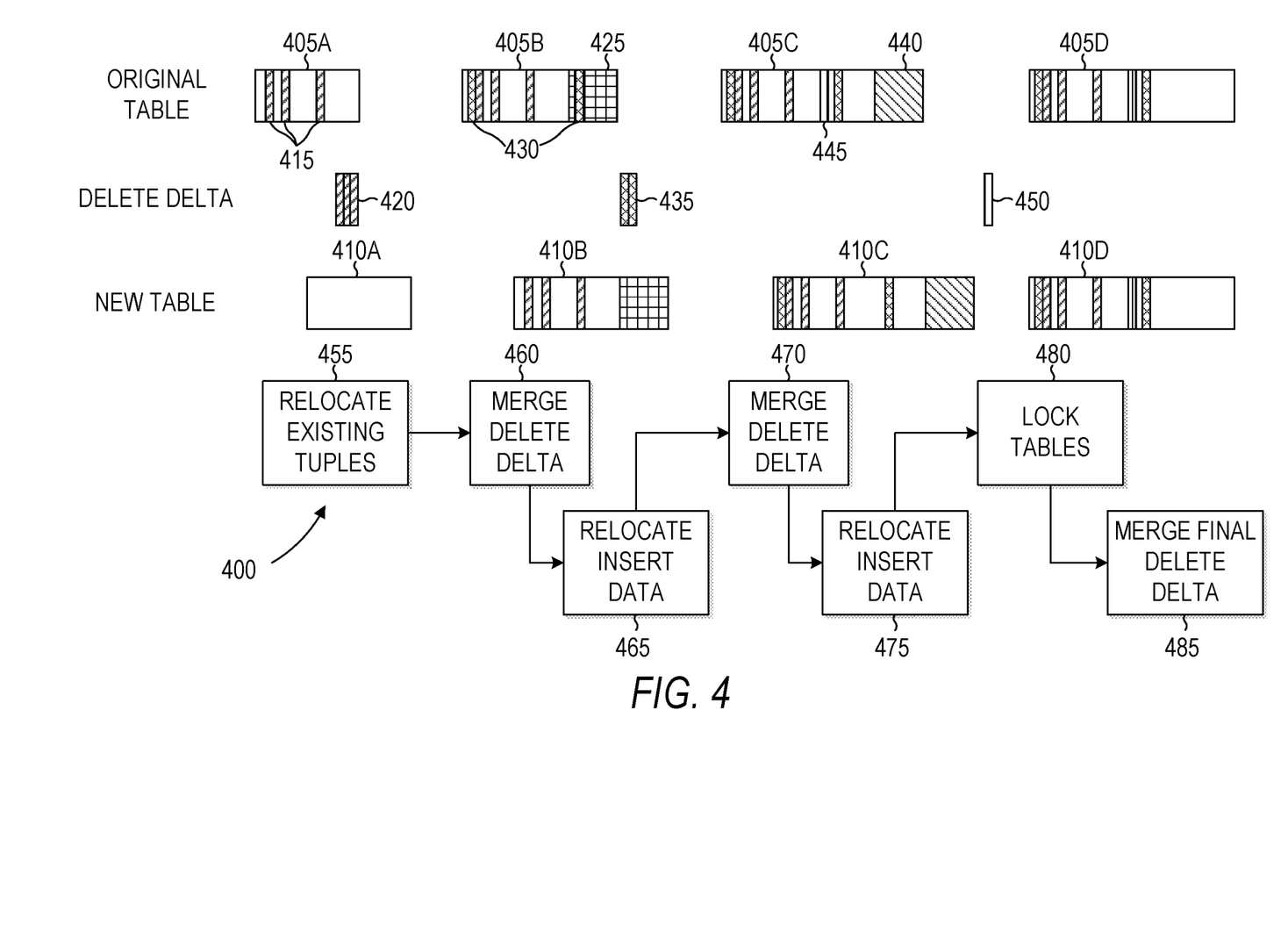
FIG. 4 is an illustration of a method for redistributing table data in a database cluster, along with example data, according to some example embodiments.

FIG. 4 is an illustration of a method 400 for redistributing table data in a database cluster, along with example data, according to some example embodiments. The method 400 includes operations 455, 460, 465, 470, 475, 480, and 485 shown approximately aligned with states 405A, 405B, 405C, and 405D of an original table, states 420, 435, and 450 of a delete delta table, and states 410A, 410B, 410C, and 410D of a new table. Additionally, deleted tuples 415, 430, and 445 and appended tuple blocks 425 and 440 are shown.

When the method 400 begins, the original table is in state 405A and tuples 415 have not yet been deleted. In operation 455, the existing tuples of state 405A are copied to the new table, placing the new table in state 410A. During the relocation of the existing tuples, the tuples 415 are deleted (e.g., through application or user interaction) and identifiers for the tuples 415 are added to the delete delta table, placing the delete delta table in state 420. The tuples of the new table may be distributed among the database nodes in a different manner from that of the old table. For example, a different hash function may be used on each tuple to determine which node to store the tuple on.

In operation 460, the delete change is merged, causing the tuples 415 to be deleted from the new table, as shown in state 410A. Identifiers for the tuples 415 are also removed from the delete delta table, since they no longer need to be deleted from the new table. During operations 455 and 460, tuples were inserted into the old table as appended tuple block 425.

In operation 465, the data inserted into the old table during operations 455-460 are relocated to the new table, as shown in state 410B. However, during operation 465, the tuples 430 are deleted from the old table and identifiers of the tuples 430 are added to the delete delta table, placing it in state 435.

In operation 470, the delete data is merged again, causing the tuples 430 to be deleted from the new table, as shown in state 410C. As in operation 460, the identifiers of the tuples deleted from the new table are removed from the delete delta table. During operations 465 and 470, tuples were inserted into the old table as appended tuple block 440. Additionally, tuple 445 was deleted from the old table and an identifier of the tuple 445 inserted into the delete delta table, placing it in state 450.

Though operations 460 and 465 are repeated once in the method 400 (as operations 470 and 475), operations 460 and 465 may be repeated any number of times. The number of tuples added and deleted from the old table in each iteration may vary based on size of the old table, but will also depend on the amount of time consumed in the iteration. For example, if the size of the original table is large (e.g., containing millions of tuples) at the beginning of the method 400, the operation 455 may take a relatively large amount of time (e.g., 10 minutes) during which some tuples will be added and deleted. However, the number of tuples added and deleted will likely be small compared to the size of the entire table (e.g., 1%). As a result, the first iteration of operations 460 and 465 will take a small amount of time compared to the time taken by operation 455 (e.g., 1%). Since the first iteration of operations 460 and 465 took less time than operation 455, the number of tuples added and deleted during the first iteration will be small compared to the number of tuples added and deleted during operation 455 (e.g., 1% of the previous amount or 0.01% of the size of the original table). Thus, each iteration of operations 460 and 465 will likely be faster than the previous one and will merge and relocate fewer tuples. After a predetermined number of iterations or when the number of tuples to be inserted and deleted falls below a predetermined threshold, the method 400 proceeds with operation 480.

In operation 480, the new table and the old table are locked, preventing modification of either table. In operation 485, the final delete delta is merged, removing any tuples identified by the delete delta table from the new table, placing it in the state 410D. After operation 480 is complete, the new table contains the same data as the old table, but has been distributed among the database nodes according to the new distribution function. The old table may be dropped, the new table enabled in place of the old table, and the lock released. In this way, the table is locked for a much smaller period of time than required by previous methods.

Figure 5:
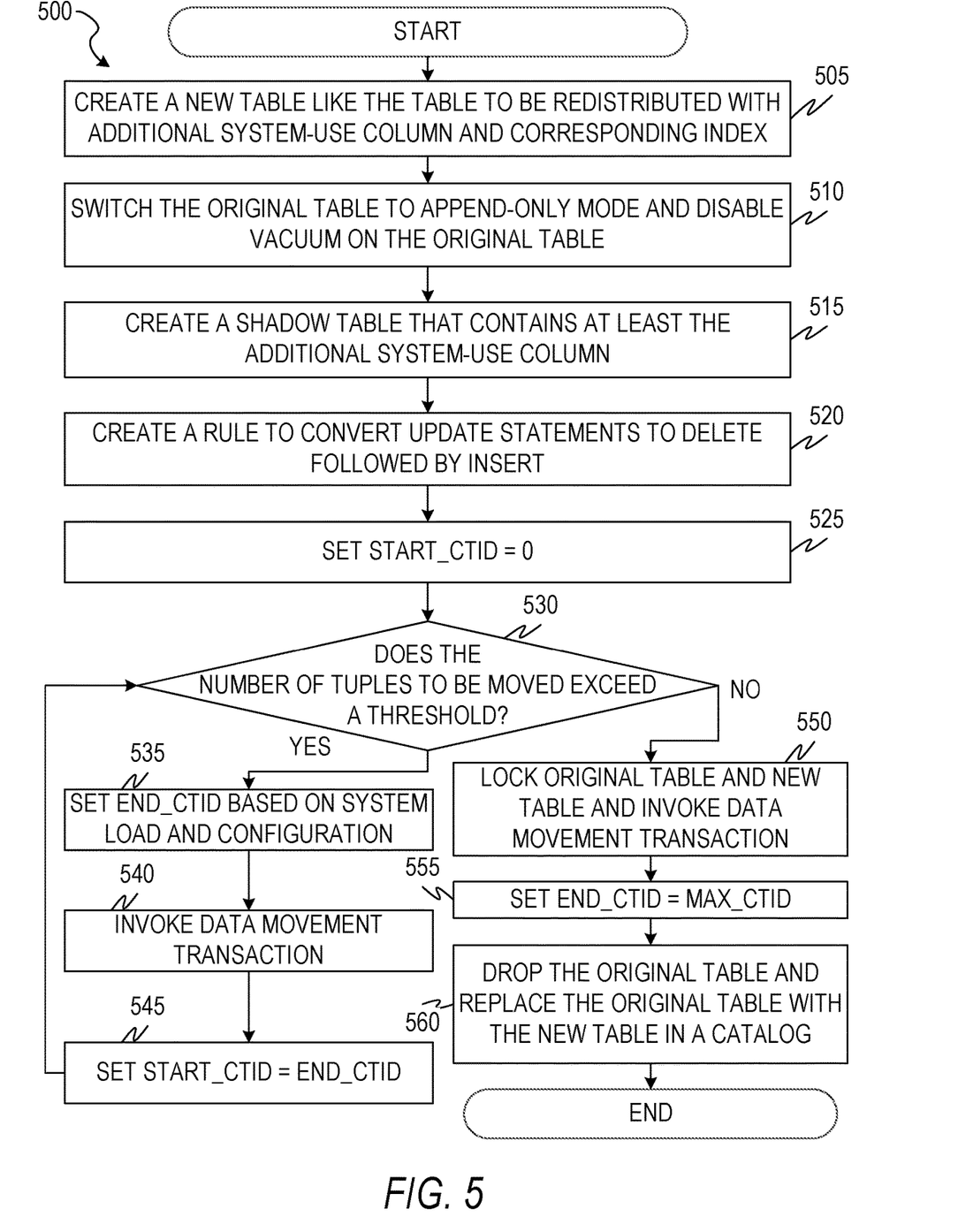
FIG. 5 is an illustration of a method for redistributing table data in a database cluster, according to some example embodiments.

FIG. 5 is an illustration of a method 500 for redistributing table data in a database cluster, according to some example embodiments. The method 500 is similar to the method 400, with the inclusion of additional details. The method 500 includes operations 505, 510, 515, 520, 525, 530, 535, 540, 545, 550, 555, and 560. By way of example and not limitation, the method 500 is described as being performed by elements of the computer 200, described above with respect to FIG. 2, operating as part of the distributed database 150 using the database schema 300.

In operation 505, the redistribution module 265 creates a new table like the table to be redistributed with an additional system-use column (not in the table to be redistributed) and corresponding index. For example, the table to be redistributed may be the original data table 310 containing tuples composed of the original data fields 320. In operation 505, the transition data table 330 may be created that includes tuples composed of the original data fields 320 and the unique locator field 340, which may be an index field for the transition data table 330.

In operation 510, the redistribution module 265 switches the original table 310 to append-only mode and disables garbage collection operations on the original table. Switching the original table 310 to append-only mode ensures that any new tuples inserted into the original table 310 will be appended to the table rather than reusing space freed by deletions of tuples from the table. Disabling garbage collection on the original table 310 ensures that any deleted tuples from the table will remain in place rather than being reused or causing other tuples to be moved.

In operation 515, the redistribution module 265 creates a shadow table that contains at least the additional system-use column. For example, the delete data table 350 may be created, storing tuples composed of the unique locator field 340.

In operation 520, the redistribution module 265 enables a rule to convert update statements to delete followed by insert for the original table 310. Thus, an update statement will not modify a tuple of the original table 310 in place, but instead will delete the existing tuple and insert the modified tuple. Since the original table 310 was switched to append-only mode in operation 510, the modified tuple will be appended to the end of the table.

In operation 525, the redistribution module 265 initializes a start_ctid variable to 0. The start_ctid variable indicates the starting offset in the original table 310 to begin relocating tuples to the transition data table 330.

In operation 530, the redistribution module 265 determines if the number of tuples to be moved exceeds a threshold (e.g., 1000 tuples). The number of tuples to be moved may be determined by subtracting start_ctid from the current highest tuple record offset in the original table 310. In some example embodiments, operation 530 checks to see if this is the first iteration of operations 530-545. In these example embodiments, the method 500 proceeds with operation 535 regardless of the number of tuples to be moved during the first iteration.

Each table may be divided into multiple partitions, with each partition using separate storage space (e.g., by being stored on different database nodes). The number of tuples to be moved for a partition may be determined using (highest_offset−start_ctid)/record_size. In operation 525, start_ctid was set to 0. Thus, this equation simplifies to max_ctid=max (highest_offset of each partition/record_size). The threshold of operation 530 may be applied on the whole table as sum(record_to_be_moved_of each_partition)>threshold. Since the old table may be updated continuously during redistribution, the highest_offset for one or more partitions may change during each iteration. If the threshold is exceeded, the method 500 continues with operation 535, otherwise, operation 550 is performed next.

In operation 535, the redistribution module 265 sets an end_ctid variable based on system load and configuration. The number of tuples being moved in the current iteration is determined by the difference between end_ctid and start_ctid. Accordingly, end_ctid may be set to a predetermined amount greater than start_ctid (e.g., 1000) or dynamically determined based on current usage of the distributed database 150 (e.g., set to a larger value if current usage is low and to a lower value if current usage is high). As another example, the number of tuples being moved may be set to the number of tuples in a segment of the table. E.g., in some example embodiments, end_ctid=start_ctid+min (predetermined_threshnold_number_of rows/number_of partitions_in_table, maximum_segment_size/record_size).

In operation 540, the redistribution module 265 invokes a data movement transaction. For example, tuples in the range start_ctid to end_ctid may be relocated from the original table 310 to the transition table 330. Additionally, any tuples indicated in the delete delta table may be deleted from the transition table 330.

In operation 545, the redistribution module 265 sets the start_ctid variable to the value of the end_ctid variable. Thus, when the method 500 again copies tuples from the original table 310 to the transition table 330, the copying will begin with the last uncopied tuple. After operation 545, the method 500 returns to the operation 530.

Operations 530-545 are repeated until the number of tuples to be moved no longer exceeds the threshold, at which point the method 500 continues with operation 550.

In operation 550, the redistribution module 265 locks the original table 310 and the new table (e.g., the transition table 330) and invokes the data movement transaction. Since the tables have been locked, no new differences between the two tables can be created during the data movement transaction and after the data movement transaction is complete, the new table will contain an accurate copy of the old table. In operation 555, the redistribution module 265 sets end_ctid equal to max_ctid, where max_ctid is the identifier of the last tuple in the original table 310.

In operation 560, the redistribution module 265 drops the original table 310 and replaces the original table 310 with the new table (e.g., the transition table 330) in a catalog. This replacement will cause future queries that use the name of the original table to access the new table. After the catalog is updated, the lock is released.

Figure 6:
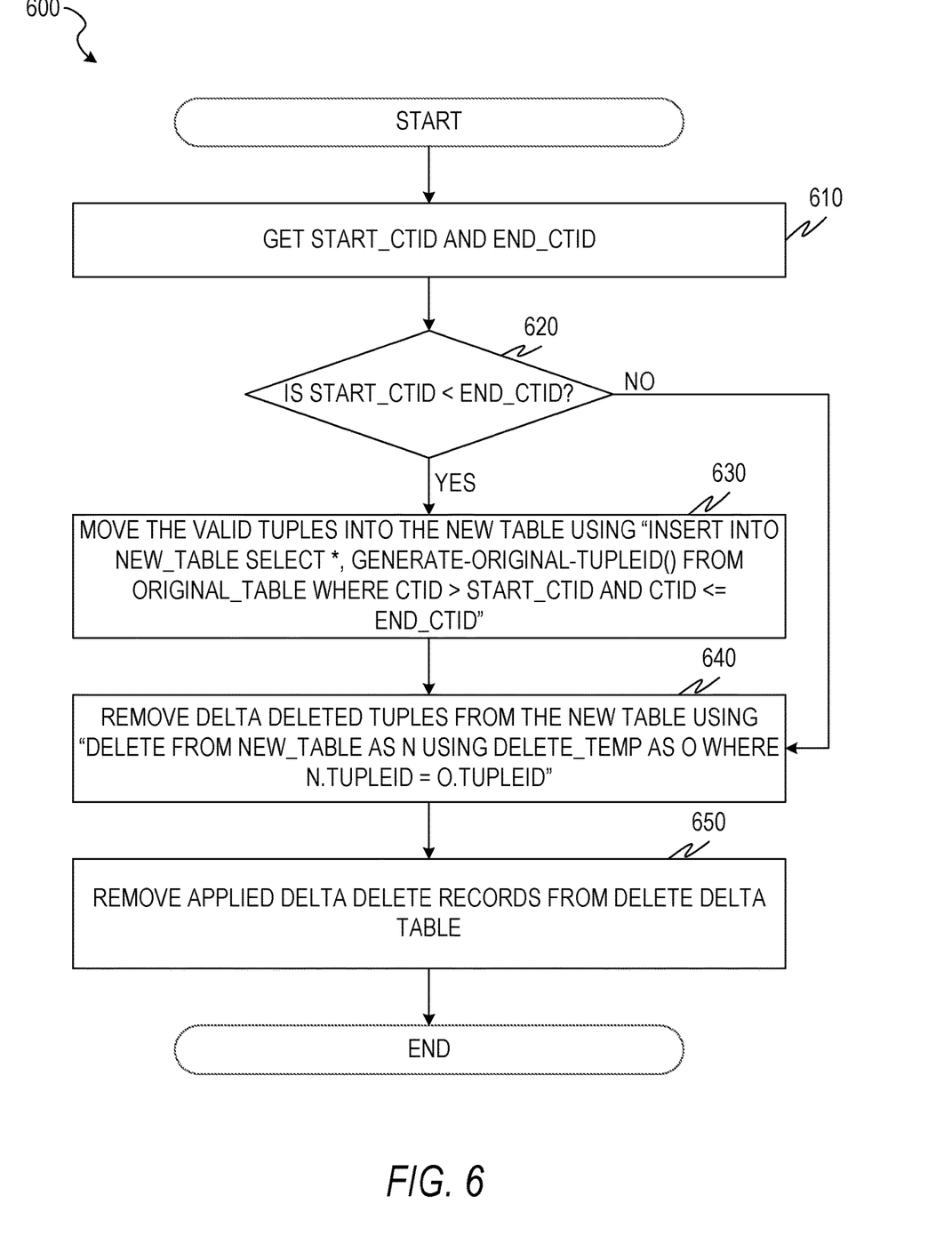
FIG. 6 is an illustration of a method for redistributing table data in a database cluster, according to some example embodiments.

FIG. 6 is an illustration of a method 600 for redistributing table data in a database cluster, according to some example embodiments. The method 600 includes operations 610, 620, 630, 640, and 650. By way of example and not limitation, the method 600 is described as being performed by elements of the computer 200, described above with respect to FIG. 2, operating as part of the distributed database 150 using the database schema 300. The method 600 is an example implementation of the operations 460 and 465 of FIG. 4 and the operation 540 of FIG. 5.

In operation 610, the redistribution module 265 gets values for start_ctid and end_ctid, the begin and end offsets of the table partition for a current iteration of data movement.

In operation 620, the redistribution module 265 determines if start_ctid is less than end_ctid. If so, there are tuples to be moved and the method 600 continues with operation 630. Otherwise, operation 630 is skipped and the method 600 continues with operation 640.

In operation 630, the redistribution module 265 moves the valid tuples into the new table using "INSERT INTO NEW_TABLE SELECT *, GENERATE-ORIGINAL-TUPLEID( ) FROM ORIGINAL_TABLE WHERE CTID>START_CTID AND CTID<=END_CTID." In this example, NEW_TABLE corresponds to the transition table 330, ORIGINAL_TABLE corresponds to the original table 310, and GENERATE-ORIGINAL-TUPLEID( ) is a function that generates a unique value for a tuple (e.g., an offset of the tuple in a data file storing the tuple in the original table). The unique value for the tuple may be stored in the unique locator field 340.

In operation 640, the redistribution module 265 removes the delta deleted tuples from the new table using "DELETE FROM NEW_TABLE AS N USING DELETE_TEMP AS O WHERE N.TUPLEID=O.TUPLEID." In this example, NEW_TABLE corresponds to the transition table 330, DELETE_TEMP corresponds to the delete data table 350, and the TUPLEID field corresponds to the unique locator field 340. The redistribution module 265 removes the applied delta delete records from the delete delta table in operation 650.

Figure 7:
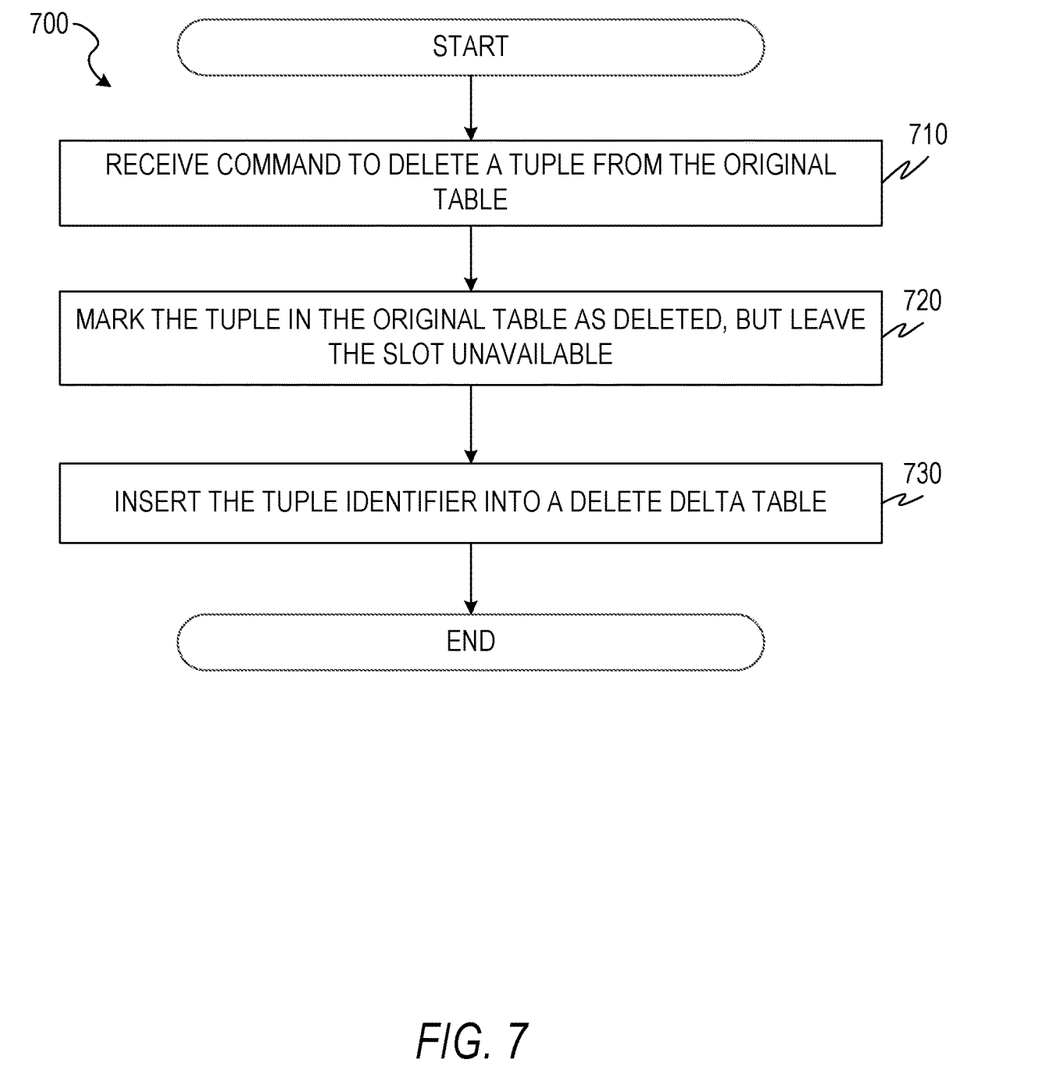
FIG. 7 is an illustration of a method for redistributing table data in a database cluster, according to some example embodiments.

FIG. 7 is an illustration of a method 700 for redistributing table data in a database cluster, according to some example embodiments. The method 700 includes operations 710, 720, and 730. By way of example and not limitation, the method 700 is described as being performed by elements of the computer 200, described above with respect to FIG. 2, operating as part of the distributed database 150 using the database schema 300. The method 700 handles a command to delete a tuple from the original table 310 during execution of one or more of the methods 400, 500, and 600.

In operation 710, the query execution module 270 receives a command to delete a tuple from the original table 310. In operation 720, the query execution module 270 marks the tuple in the original table 310 as deleted, but leaves the slot occupied by the tuple unavailable. Thus, after operation 720, future queries of the original table 310 will ignore the deleted tuple, but the physical storage occupied by the tuple will not be reused by any other tuple.

In operation 730, the unique identifier of the tuple is inserted into a delete delta table. The unique identifier may correspond to the physical storage location of the tuple. After completion of the method 700, future queries on the original table 310 will return the correct results, since the tuple is deleted. Additionally, since the unique identifier of the tuple has been added to the delete delta table, operation 640 of the method 600 will correctly delete the tuple from the transition table 330 when method 600 is invoked.

Figure 8:
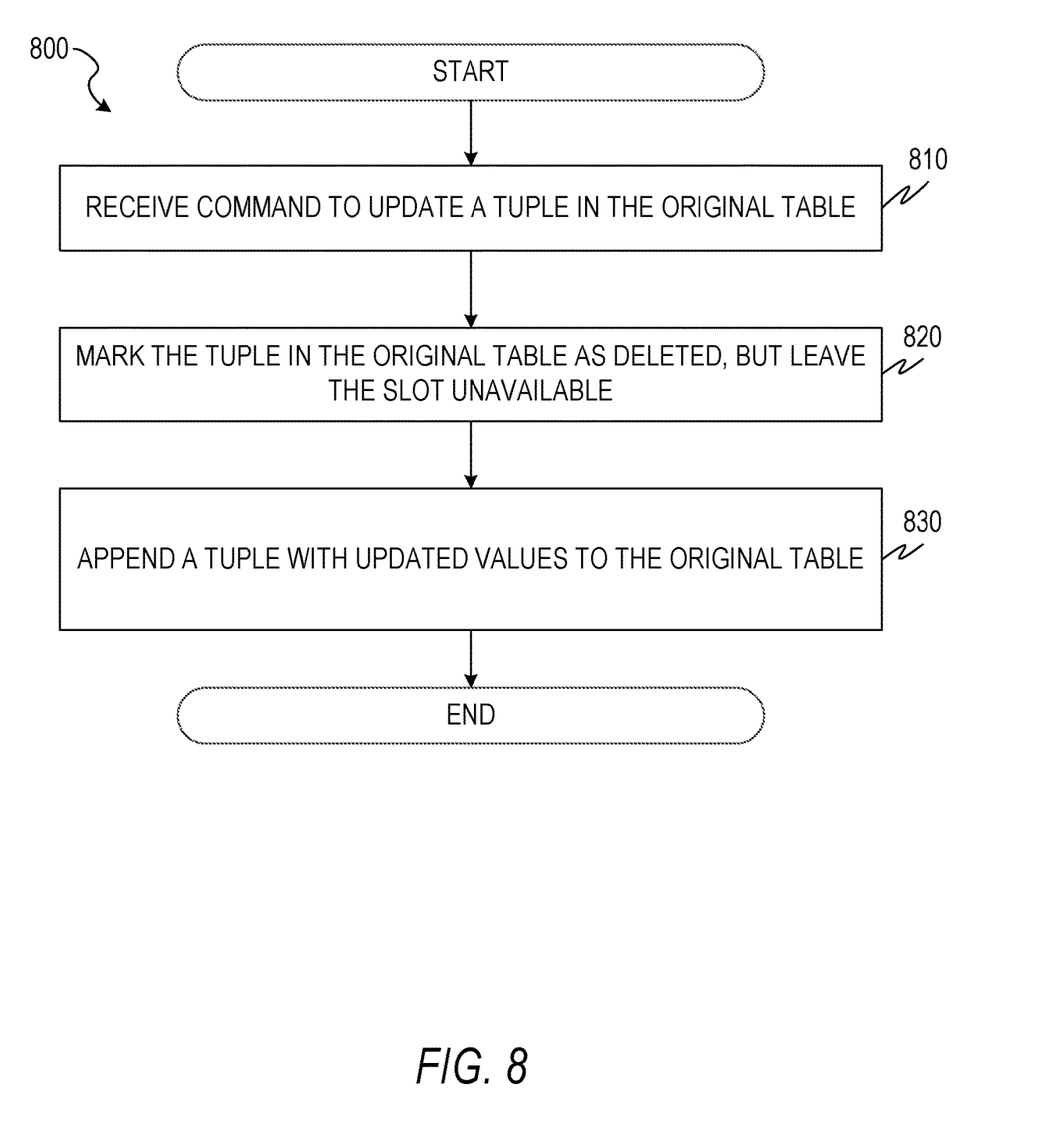
FIG. 8 is an illustration of a method for redistributing table data in a database cluster, according to some example embodiments.

FIG. 8 is an illustration of a method for redistributing table data in a database cluster, according to some example embodiments. The method 800 includes operations 810, 820, and 830. By way of example and not limitation, the method 800 is described as being performed by elements of the computer 200, described above with respect to FIG. 2, operating as part of the distributed database 150 using the database schema 300. The method 800 handles a command to update a tuple in the original table 310 during execution of one or more of the methods 400, 500, and 600.

In operation 810, the query execution module 270 receives a command to update a tuple in the original table 310. The command to update the tuple includes modification data (e.g., an updated value for a member of the tuple). In operation 820, the query execution module 270 marks the tuple in the original table 310 as deleted, but leaves the slot occupied by the tuple unavailable. Operation 820 may be implemented by execution of the method 700. Thus, after operation 820, future queries of the original table 310 will ignore the deleted tuple, but the physical storage occupied by the tuple will not be reused by any other tuple.

In operation 830, the query execution module 270 appends a tuple with the updated values to the original table 310. The updated values include the modification data. After completion of the method 800, future queries on the original table 310 will return the correct results, since the only extant copy of the tuple is the updated tuple. Additionally, since the updated tuple has been appended to the original table 310, operation 630 of the method 600 will correctly copy the updated tuple to the transition table 330 when the method 600 is invoked.

Figure 9:
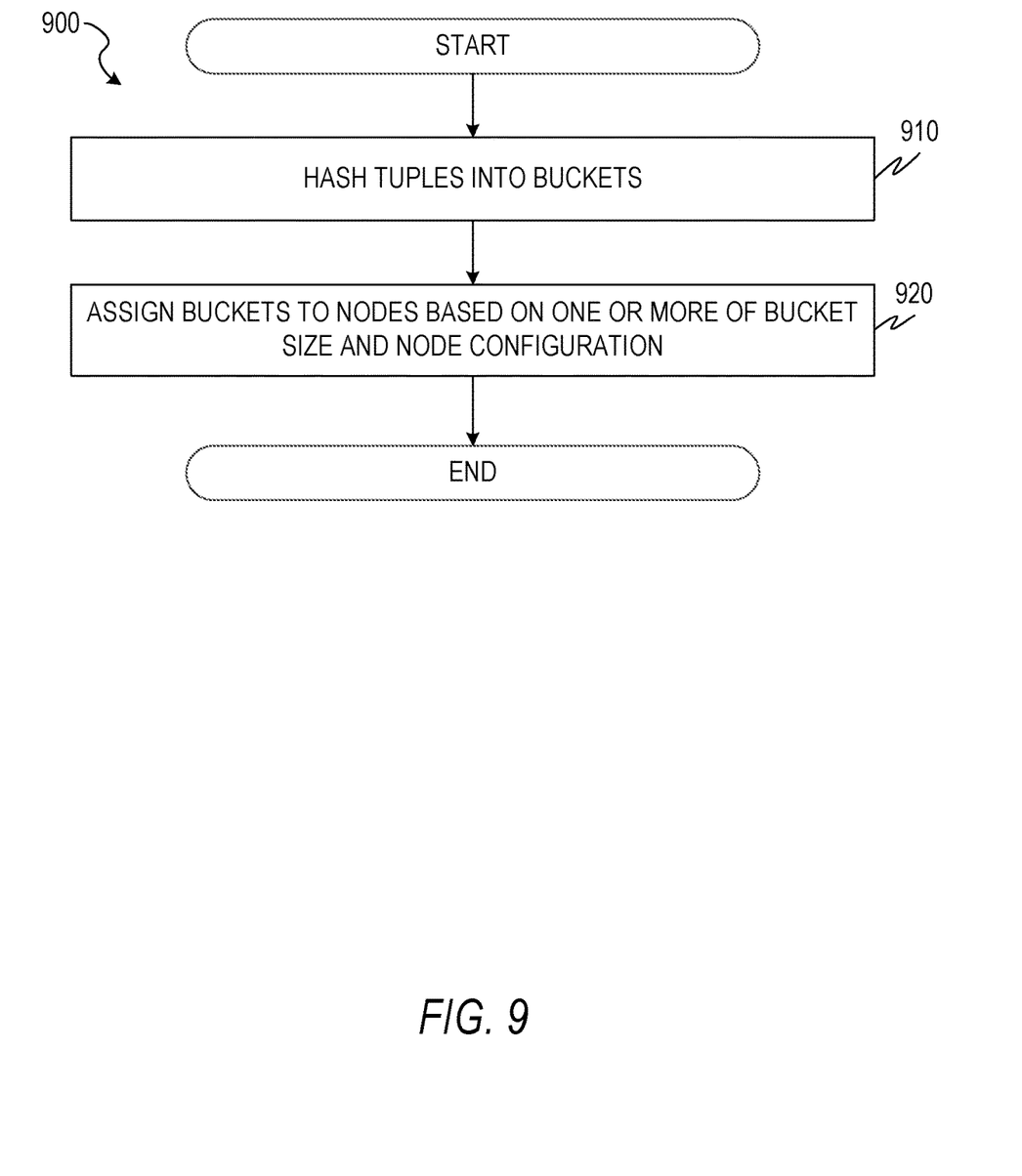
FIG. 9 is an illustration of a method for redistributing table data in a database cluster, according to some example embodiments.

FIG. 9 is an illustration of a method 900 for redistributing table data in a database cluster, according to some example embodiments. The method 900 includes operations 910 and 920. By way of example and not limitation, the method 900 is described as being performed by elements of the computer 200, described above with respect to FIG. 2, operating as part of the distributed database 150 using the database schema 300. The method 900 may be used to distribute tuples amongst the database nodes 130 of the distributed database 150.

In operation 910, the storage module 260 hashes tuples into buckets. For example, a binary data representation of the tuple may be hashed to generate a hash value for the tuple. A range of hash values is assigned to each bucket, and tuples having hash values in the range are placed into the bucket.

In operation 920, the storage module 260 assigns buckets to database nodes based on one or more of bucket size and node configuration. For example, more powerful nodes (e.g., nodes having more processors, faster storage access, larger cache memory, or any suitable combination thereof) may be assigned more buckets than less powerful nodes. As another example, multiple buckets containing fewer tuples may be assigned to one node while a single bucket containing more tuples may be assigned to another node. Tuples in the buckets assigned to a node may be stored on that node. By comparison with existing methods that assign hash ranges directly to nodes (e.g., by creating the same number of buckets as nodes and assigning one bucket to each node), the method 900 allows data to be distributed among the database nodes 130 of a distributed database 150 in an efficient manner even if the hash function generates unevenly-sized buckets.

Figure 10:
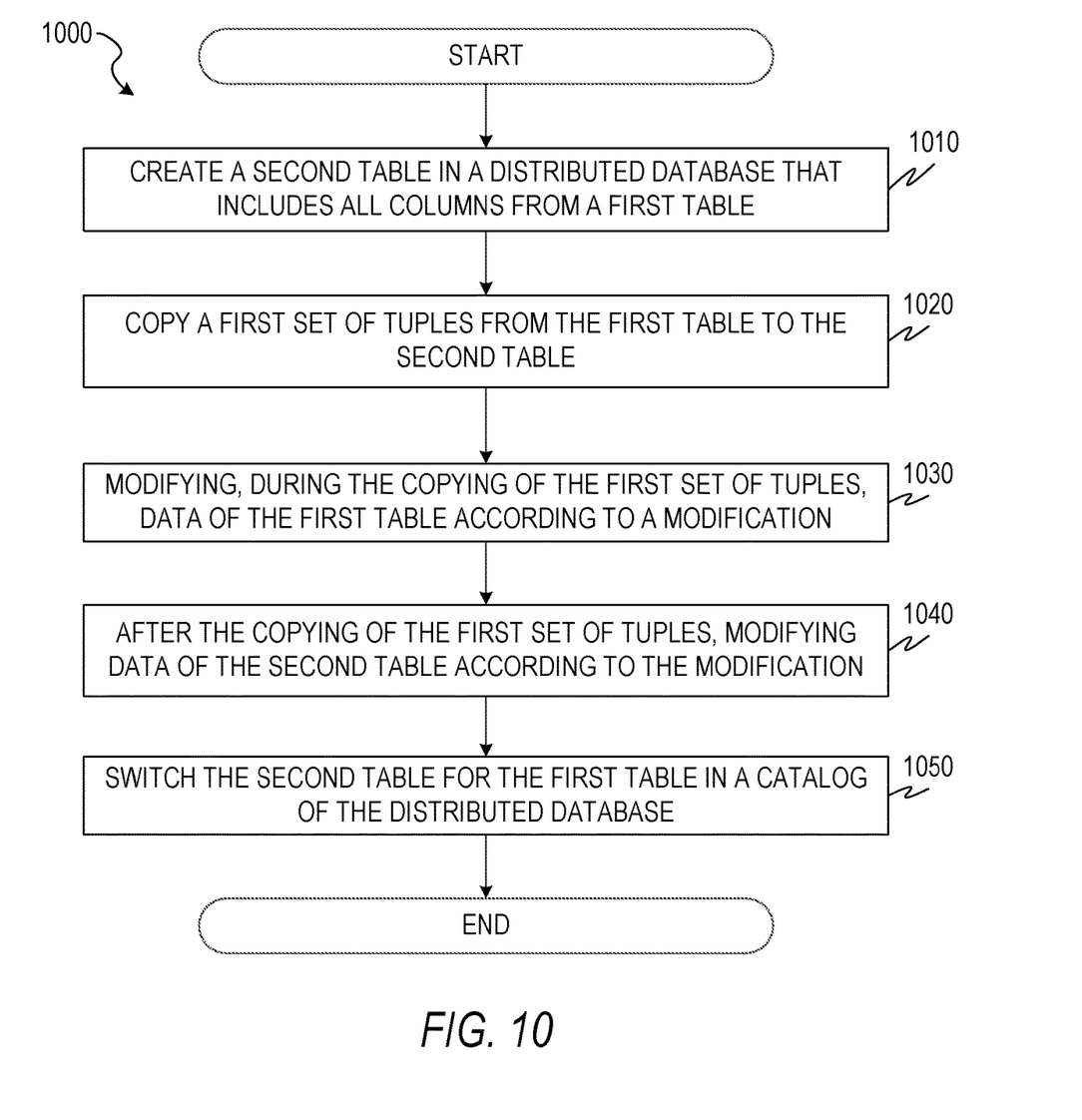
FIG. 10 is an illustration of a method for redistributing table data in a database cluster, according to some example embodiments.

FIG. 10 is an illustration of a method 1000 for redistributing table data in a database cluster, according to some example embodiments. The method 1000 includes operations 1010, 1020, 1030, 1040, and 1050. By way of example and not limitation, the method 1000 is described as being performed by elements of the computer 200, described above with respect to FIG. 2, operating as part of the distributed database 150 using the database schema 300.

In operation 1010, the redistribution module 265 creates a second table in a distributed database that includes all columns from a first table. In operation 1020, the redistribution module 265 copies a first set of tuples from the first table to the second table. For example, the first set of tuples may be a fixed number of tuples (e.g., 1000 tuples), all tuples in the first column at the time the operation 1020 is begun, or a number of tuples selected based on a load of the distributed database. Tuples of the second table may be distributed among the nodes of the distributed database differently that tuples of the first table. For example, a different hash function may be used to generate the distribution, different hash ranges may be assigned to the nodes, a different number of hash buckets may be used, a different distribution of hash buckets to nodes may be used, or any suitable combination thereof.

In operation 1030, the query execution module 270 modifies, during the copying of the first set of tuples, data of the first table according to a modification (e.g., an insertion, deletion, or update of one or more tuples of the first data table). In operation 1040, after the copying of the first set of tuples, the redistribution module 265 modifies data of the second table according to the modification. In operation 1050, the redistribution module 265 switches the second table for the first table in a catalog of the distributed database. After the switch, further modifications intended for the first table will be executed against the second table.

Although a few embodiments have been described in detail above, other modifications are possible. For example, the logic flows depicted in the figures do not require the particular order shown, or sequential order, to achieve desirable results. Other steps may be provided in, or steps may be eliminated from, the described flows, and other components may be added to, or removed from, the described systems. Other embodiments may be within the scope of the following claims.

What is claimed is:

1. A computer-implemented method of relocating data among nodes in a distributed database, the method comprising:

creating, by one or more processors, a second table on a second node in the distributed database, the second table including all columns from a first table on a first node in the distributed database;

copying, by the one or more processors, a first set of tuples from the first table to the second table;

receiving, by the one or more processors, a user change to data of the first table, the user change including a modification operation including updating an existing tuple in the first table by appending an updated existing tuple to the data of the first table and deleting the existing tuple in the first table;

appending, by the one or more processors, the updated existing tuple to the data of the second table;

deleting the existing tuple in the second table; and switching, by the one or more processors, the second table for the first table in a catalog of the distributed database, whereby a subsequent modification operation intended for the first table is executed against the second table.

2. The method of claim 1, further comprising:

distributing data for the first table among nodes of the distributed database based on a first hash function; and wherein the copying of the first set of tuples from the first table to the second table comprises distributing data for the first table among nodes of the distributed database based on a second hash function different from the first hash function.

3. The method of claim 1, wherein the creating of the second table comprises creating the second table with an additional column not from the first table, the additional column containing a unique identifier for each tuple in the second table.

4. The method of claim 3, further comprising:

prior to the switching of the second table for the first table in the catalog, dropping the additional column.

5. The method of claim 1, further comprising:

creating a third table to track deletions from the first table;

receiving a request to delete a first tuple from the first table;

responsive to the request, adding a second tuple to the third table that includes an identifier of the second tuple; and deleting the first tuple from the data of the first table.

6. The method of claim 5, further comprising:

based on the identifier included in the second tuple of the third table and a third tuple of the second table, deleting the third tuple from the second table.

7. The method of claim 1, further comprising:

creating a third table to track deletions from the first table;

receiving a request to update a first tuple of the first table, the request including modification data;

responsive to the request:

adding a second tuple to the third table that includes an identifier of the first tuple; and appending a third tuple to the first table that includes the modification data;

based on the identifier included in the second tuple of the third table and a fourth tuple of the second table, deleting the fourth tuple from the second table; and appending a fifth tuple to the second table that includes the modification data.

8. The method of claim 1, further comprising:

before the switching of the second table for the first table in the catalog of the distributed database, locking the first table.

9. The method of claim 8, further comprising:
determining a number of modification operations remaining to be applied to the second table; and wherein
the locking of the first table is based on the number of modification operations and a predetermined threshold.

10. The method of claim 1, further comprising:
determining a number of modification operations remaining to be applied to the second table; and
based on the number of modification operations remaining to be applied to the second table and a predetermined threshold, applying at least a subset of the modification operations to the second table without locking the first table.

11. A distributed database, comprising:
a plurality of data storage nodes;
a memory storage comprising instructions; and
one or more processors in communication with the memory and with the plurality of data storage nodes, wherein the one or more processors execute the instructions to perform:
creating a second table on a second node in the distributed database, the second table including all columns from a first table on a first node in the distributed database;
copying a first set of tuples from the first table to the second table;
receiving a user change to data of the first table, the user change including a modification operation including updating an existing tuple in the first table by appending an updated existing tuple to the data of the first table and deleting the existing tuple in the first table;
appending, by the one or more processors, the updated existing tuple to the data of the second table;
deleting the existing tuple in the second table;
switching the second table for the first table in a catalog of the distributed database, whereby a subsequent modification operation intended for the first table is executed against the second table.

12. The distributed database of claim 11, wherein the one or more processors further perform:
distributing data for the first table among nodes of the distributed database based on a first hash function; and
wherein the copying of the first set of tuples from the first table to the second table comprises distributing data for the first table among nodes of the distributed database based on a second hash function different from the first hash function.

13. The distributed database of claim 11, wherein the creating of the second table comprises creating the second table with an additional column not from the first table, the additional column containing a unique identifier for each tuple in the second table.

14. The distributed database of claim 13, wherein the one or more processors further perform:
prior to the switching of the second table for the first table in the catalog, dropping the additional column.

15. The distributed database of claim 11, wherein the one or more processors further perform:
creating a third table to track deletions from the first table;
receiving a request to delete a first tuple from the first table;
responsive to the request, adding a second tuple to the third table that includes an identifier of the second tuple; and
deleting the first tuple from the data of the first table.

16. The distributed database of claim 15, further comprising:
based on the identifier included in the second tuple of the third table and a third tuple of the second table, deleting the third tuple from the second table.

17. The distributed database of claim 11, wherein the one or more processors further perform:
creating a third table to track deletions from the first table;
receiving a request to update a first tuple of the first table, the request including modification data;
responsive to the request:
adding a second tuple to the third table that includes an identifier of the first tuple; and
appending a third tuple to the first table that includes the modification data;
based on the identifier included in the second tuple of the third table and a fourth tuple of the second table, deleting the fourth tuple from the second table; and
appending a fifth tuple to the second table that includes the modification data.

18. A non-transitory computer-readable medium storing computer instructions for relocating data among nodes in a distributed database, that when executed by one or more processors, cause the one or more processors to perform steps of:
creating a second table on a second node in the distributed database, the second table including all columns from a first table on a first node in the distributed database;
copying a first set of tuples from the first table to the second table;
receiving a user change to data of the first table, the user change including a modification operation including updating an existing tuple in the first table by appending an updated existing tuple to the data of the first table and deleting the existing tuple in the first table;
appending, by the one or more processors, the updated existing tuple to the data of the second table;
deleting the existing tuple in the second table; and
switching the second table for the first table in a catalog of the distributed database, whereby a subsequent modification operation intended for the first table is executed against the second table.

19. The medium of claim 18, further comprising instructions that when executed by the one or more processors cause the one or more processors to perform additional steps of:
determining a number of modification operations remaining to be applied to the second table; and
based on the number of modification operations remaining to be applied to the second table and a predetermined threshold, locking the first table before the switching of the second table for the first table in the catalog of the distributed database.

20. The medium of claim 18, further comprising instructions that when executed by the one or more processors cause the one or more processors to perform additional steps of:
determining a number of modification operations remaining to be applied to the second table; and
based on the number of modification operations remaining to be applied to the second table and a predetermined threshold, applying at least a subset of the modification operations to the second table without locking the first table.

* * * * *